United States Patent
Zhang et al.

(10) Patent No.: US 11,443,146 B2
(45) Date of Patent: Sep. 13, 2022

(54) METHODS, DEVICES, AND COMPUTER PROGRAM PRODUCTS FOR MODEL ADAPTATION

(71) Applicant: EMC IP Holding Company LLC, Hopkinton, MA (US)

(72) Inventors: Ruixue Zhang, Shanghai (CN); Jinpeng Liu, Shanghai (CN); Zhenzhen Lin, Shanghai (CN); Pengfei Wu, Shanghai (CN); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 331 days.

(21) Appl. No.: 16/805,065

(22) Filed: Feb. 28, 2020

(65) Prior Publication Data
US 2021/0166083 A1 Jun. 3, 2021

(30) Foreign Application Priority Data
Nov. 29, 2019 (CN) .......................... 201911200675.X (51) Int. Cl.
G06K 9/62 (2022.01)
G06N 20/10 (2019.01)
G16Y 40/20 (2020.01)

(52) U.S. Cl.
CPC ......... *G06K 9/6264* (2013.01); *G06K 9/6257* (2013.01); *G06K 9/6292* (2013.01); *G06N 20/10* (2019.01); *G16Y 40/20* (2020.01)

(58) Field of Classification Search
CPC .. G06K 9/6264; G06K 9/6257; G06K 9/6292; G06N 20/10; G16Y 40/20
See application file for complete search history.

(56) References Cited

U.S. PATENT DOCUMENTS

2017/0236060 A1* 8/2017 Ignatyev ............. G06F 16/2365
706/46

OTHER PUBLICATIONS

K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.
(Continued)

Primary Examiner — David F Dunphy
(74) Attorney, Agent, or Firm — Ryan, Mason & Lewis, LLP (57) ABSTRACT

Embodiments of the present disclosure provide methods, devices, and computer program products for model adaptation. The method for model adaptation comprises: receiving, at a first computing device, a data set to be analyzed from a data collector and determining abnormality of the data set to be analyzed using a machine learning model deployed at the first computing device. The method further comprises transmitting, based on the determined abnormality of the data set, at least a portion of data in the data set to a second computing device, for update of the machine learning model, the second computing device having a higher computing capability than the first computing device. The method further comprises obtaining redeployment of the updated machine learning model from the second computing device.

20 Claims, 7 Drawing Sheets (56) References Cited

OTHER PUBLICATIONS

Wikipedia, "Kalman Filter," https://en.wikipedia.org/w/index.php?title=Kalman_filter&oldid=902108093, Jun. 16, 2019, 30 pages.
codeplea.com, "Interpolating in a Triangle," https://codeplea.com/triangular-interpolation, Nov. 30, 2016, 8 pages.
T.J. Chung, "Computational Fluid Dynamics," Cambridge University Press, Second Edition, Sep. 27, 2010, 21 pages.
spark.apache.org, "Clustering—RDD-Based API," http://spark.apache.org/docs/latest/mllib-clustering.html, downloaded Jun. 27, 2019, 20 pages.
S. Ahmad et al., "Unsupervised Real-Time Anomaly Detection for Streaming Data," Neurocomputing, Apr. 22, 2017, pp. 134-147.
U.S. Appl. No. 16/536,599 filed in the name of Zhenzhen Lin et al. filed Aug. 9, 2019, and entitled "Method, Device and Computer Program Product for Data Analysis.".

\* cited by examiner

METHODS, DEVICES, AND COMPUTER PROGRAM PRODUCTS FOR MODEL ADAPTATION

RELATED APPLICATION(S)

The present application claims priority to Chinese Patent Application No. 201911200675.X, filed Nov. 29, 2019, and entitled "Methods, Devices, and Computer Program Products for Model Adaptation," which is incorporated by reference herein in its entirety.

FIELD

Embodiments of the present disclosure relate to the field of data analysis, and more specifically to methods for model adaptation, electronic devices, and computer program products.

BACKGROUND

In recent years, with the development of computer technologies, the Internet of Things (IoT) has been increasingly applied to all aspects of people's lives. A core of the IoT technology is to analyze data obtained by IoT devices such as various temperature sensors, position sensors, imaging sensors, meters, and the like. The sensor data may advantageously support advanced warning, prediction, and so on for people. However, such sensor data is usually massive so that the resource consumption for transmission and processing of the sensor data is high. As the artificial intelligence technology develops, currently it has been proposed to utilize a machine learning model to provide more accurate data analysis. However, training and application of the machine learning model pose new challenges to resource consumption. Therefore, the current focus is placed on how to analyze the massive sensor data in the IoT effectively.

SUMMARY

Embodiments of the present disclosure provide a solution for model adaptation.

In a first aspect of the present disclosure, there is provided a method for model adaptation. The method comprises receiving, at a first computing device, a data set to be analyzed from a data collector and determining abnormality of the data set to be analyzed using a machine learning model deployed at the first computing device. The method further comprises transmitting, based on the determined abnormality of the data set, at least a portion of data in the data set to a second computing device, for update of the machine learning model, the second computing device having a higher computing capability than the first computing device. The method further comprises obtaining redeployment of the updated machine learning model from the second computing device.

In a second aspect of the present disclosure, there is provided a method for model adaptation. The method comprises deploying, at a second computing device, a trained machine learning model to a first computing device, the machine learning model being configured to determine abnormality of a data set to be analyzed from a data collector, and the second computing device having a higher computing capability than the first computing device; receiving at least a portion of data in the data set from the first computing device; updating the machine learning model based on the received portion of data; and redeploying the updated machine learning model to the first computing device.

In a third aspect of the present disclosure, there is provided an electronic device. The electronic device comprises at least one processor; and at least one memory storing computer program instructions, the at least one memory and the computer program instructions being configured, with the at least one processor, to cause the electronic device to perform acts. The acts comprise receiving a data set to be analyzed from a data collector; determining abnormality of the data set using a machine learning model deployed at the electronic device; transmitting, based on the determined abnormality of the data set, at least a portion of data in the data set to a further electronic device for update of the machine learning model, the further electronic device having a higher computing capability than the electronic device; and obtaining redeployment of the updated machine learning model from the further electronic device.

In a fourth aspect of the present disclosure, there is provided an electronic device. The electronic device comprises: at least one processor; and at least one memory storing computer program instructions, the at least one memory and the computer program instructions being configured, with the at least one processor, to cause the electronic device to perform acts. The acts comprise deploying a trained machine learning model to a further electronic device, the machine learning model being configured to determine abnormality of a data set to be analyzed from a data collector, and the electronic device having a higher computing capability than the further electronic device; receiving at least a portion of data in the data set from the further electronic device; updating the machine learning model based on the received portion of data; and redeploying the updated machine learning model to the further electronic device.

In a fifth aspect of the present disclosure, there is provided a computer program product. The computer program product is tangibly stored on a non-transitory computer-readable medium and comprising computer-executable instructions which, when executed, cause a device to perform the method according to the above first aspect.

In a sixth aspect of the present disclosure, there is provided a computer program product. The computer program product is tangibly stored on a non-transitory computer-readable medium and comprising computer-executable instructions which, when executed, cause a device to perform the method according to the above second aspect.

The Summary is to introduce a selection of concepts in a simplified form that are further described below in the Detailed Description. This Summary is not intended to identify key or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent through the following detailed description with reference to the accompanying drawings, in which the same reference symbols refer to the same elements in exemplary embodiments of the present disclosure.

DETAILED DESCRIPTION

Principles of the present disclosure will now be described below with reference to several example embodiments shown in the accompanying drawings. Although some preferred embodiments of the present disclosure are shown in the accompanying drawings, it is to be appreciated that these embodiments are described only to enable those skilled in the art to better understand and practice the present disclosure, without suggesting any limitation to the scope of the present disclosure in any way.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one further implementation." The terms "a first," "a second" and others may denote different or the same objects. Other definitions, either explicit or implicit, may be included below.

As used herein, "machine learning" refers to processing involving high-performance computing, machine learning, and artificial intelligence algorithms. As used herein, the term "machine learning model" may also be referred to as "learning model," "learning network," "network model" or "model." A "neural network" or "neural network model" is a deep machine learning model. Generally speaking, a machine learning model receives input information and performs prediction based on the input information.

Machine learning is illustratively divided into three phases, including a training phase, a test phase, and an application phase. In the training phase, a provided machine learning model may be trained using a large amount of training samples, and the training is iterated constantly until the machine learning model may obtain, from the training samples, an ability to make consistent inferences similar to that of human intelligence. Through training, the machine training model may be capable of learning a mapping or association relationship between the input and the output from the training data. Through the training, parameter set values of the machine learning model are determined. During the test phase, the test samples can be used to test the trained machine learning model to determine the performance of the machine learning model. In the application phase, the machine learning model can be used to process real-life input information based on the parameter set values obtained from the training to provide the corresponding output.

Figure 1:
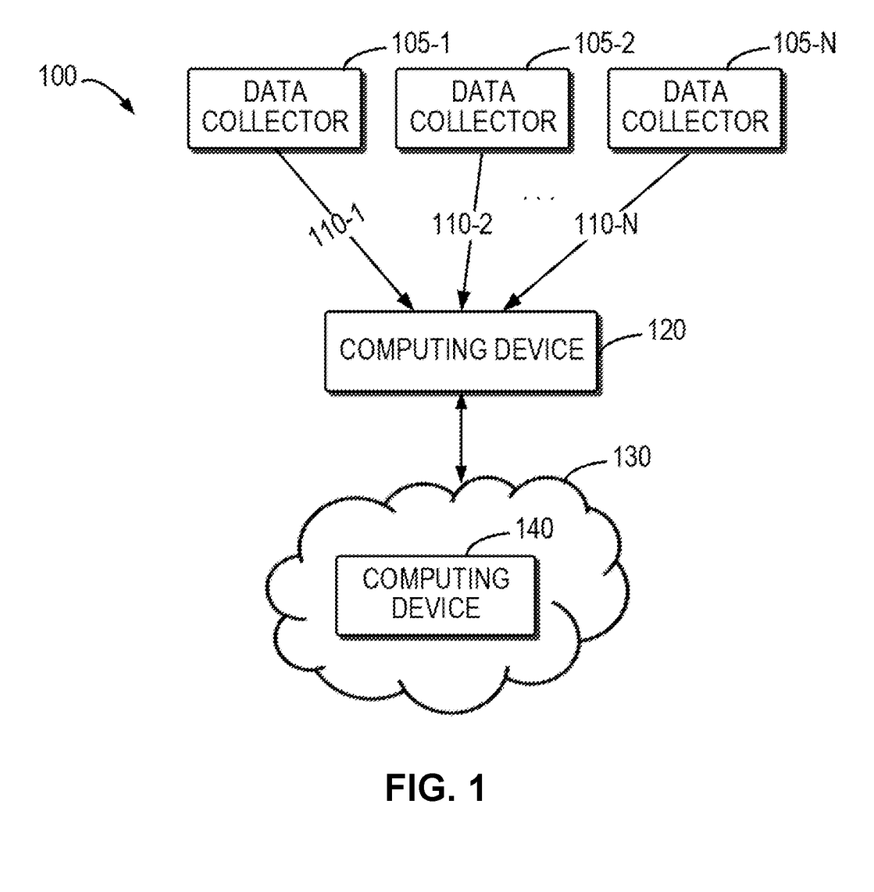
FIG. 1 illustrates a schematic diagram of an environment in which embodiments of the present disclosure can be implemented.

FIG. 1 illustrates a schematic diagram of an environment 100 in which embodiments of the present disclosure can be implemented. As shown in FIG. 1, the environment 100 includes one or more data collectors 105-1, 105-2, . . . , 105-N (collectively or individually referred to as data collectors 105, where N is a positive integer greater than or equal to 1), a computing device 120, cloud computing architecture 130, and a computing device 140 provided in the cloud computing architecture 130. The environment 100 may be considered as the Internet of Things (IoT). It is to be appreciated that the number and arrangement of the devices shown in FIG. 1 are only for purpose of illustration and should not be considered as limitations to the claimed subject matter.

In some embodiments, the computing device 120 may be an edge computing node, such as a computing node having a gateway function (also referred to as an edge gateway). The computing device 120 may be in a wired or wireless connection and communicate with one or more data collectors 105. The computing device 120 may be configured to receive data set 110-1, data set 110-2, . . . , data set 110-N to be analyzed (collectively or individually referred to as data set 110) from the one or more data collectors 105. The analysis operation of the data set 110 may be implemented by a device with a computing capability in the environment 100.

The data collectors 105 may be any devices capable of collecting data, for example, various types of sensors. Examples of the data collectors 105 include an imaging sensor, a motion sensor, a temperature sensor, a position sensor, an illumination sensor, a humidity sensor, a power sensor, a gas sensor, a smoke sensor, a humidity sensor, a pressure sensor, a positioning sensor, an accelerometer, and a gyroscope, a meter, a sound decibel sensor, and the like. During data analysis, it might be necessary to perform data anomaly detection on the data set 110, so as to discover anomaly events occurring in the environment in which the data collectors 105 are deployed and provide alerts of the anomaly events to facilitate determination of subsequent measures.

The cloud computing architecture 130 is remotely arranged to provide computation, software, data access, and storage services. The processing in the cloud computing architecture 130 may be referred to as "cloud computation." In various implementations, the cloud computation provides services over a wide area network such as the Internet using an appropriate protocol. For example, providers of the cloud computing architecture 130 provision applications over the wide area network which can be accessed through a web browser or any other computing components. Software or components of the cloud computing architecture 130 and corresponding data may be stored on servers at a remote location. The computing resources in the cloud computing architecture 130 may be aggregated at a remote data center location or can be disaggregated. Cloud computing infrastructures can deliver services through a shared data center although they can act as individual access points for users. Thus, the components and functions described herein can be provided from a service provider at a remote location using the cloud computing architecture 130. Alternatively, they can be provided from conventional servers, or can be installed on client devices directly or in any of a variety of other manners. Although illustrated as a single device, it is to be appreciated that the computing device 140 may be any component that is in the cloud computing architecture 130 and has a computing capability. Accordingly, various portions of the computing device 140 may be distributed across the cloud computing architecture 130.

A current trend is to implement data analysis and anomaly detection using the machine learning model. Anomaly detection of data may be considered as a classification problem to be solved by the machine learning model. The training and application of the machine learning model need the support of computing resources such as those for processing and storage. In order to achieve the required processing accuracy or depending on the type of model used, the size of the machine learning model may be large, thereby having higher requirements for computing resources.

In practical application, the requirements and criteria for data analysis and the data collected from data sources (e.g., from data collectors) may change over time. For example, it may be desired to first determine roughly whether the data is abnormal data and then to more precisely determine a more refined type of the abnormal data and/or the normal data. The number of the data collectors may also be increased or decreased, resulting in changes in the types and amounts of data to be processed. Therefore, another challenge in training and application of a machine learning model is how the model evolves. However, as compared with the application of the machine learning model, the training of the model consumes more resources and takes a longer period of time to complete.

In view of the above, if update and application of a machine learning model are deployed in the cloud computing architecture with a higher computing capability, the computing resource may not be the issue. However, such deployment may have an impact on the real-time response of the data analysis because a large latency may be introduced in transmission of data to be analyzed from data collectors to the cloud computing architecture and feedback of an analysis result from the cloud computing architecture, thereby failing to satisfy the requirement in real-time data anomaly detection. For example, in a scenario where a speed sensor is used to detect a running state of a vehicle, it is important to quickly detect an abnormal speed to predict a possible car accident.

In another possible implementation, if both the update and the application of the machine learning model are deployed in a computing device closer to the data sources, such as an edge computing node in the IoT, the latency of anomaly detection may be decreased by consuming computing resources of the edge computing node. This may lead to lower efficiency in both the update and the application of the model.

In accordance with embodiments of the present disclosure, a solution for model adaptation is proposed. In this solution, application and update of a machine learning model are distributed to different computing devices to implement. Specifically, the machine learning model is deployed on a first computing device which is configured to process a data set to be analyzed from a data collector. According to a processing result of the data set, the first computing device provides at least a portion of data in the data set to a second computing device. The second computing device is configured to update the machine learning model at least based on the data from the first computing device and redeploy the updated machine learning model to the first computing device. In this way, the machine learning model of the current version can be used to provide a data analysis result, meanwhile the model update can be implemented using other computing devices with a higher computing capability, which enables the model to be adapted over time.

Figure 2:
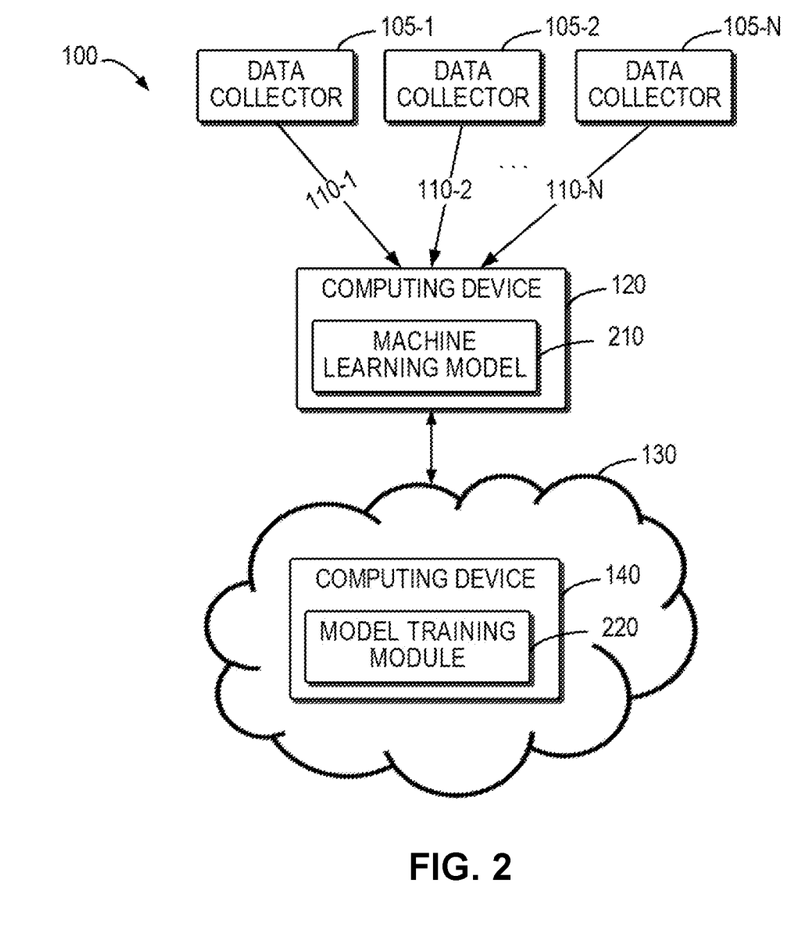
FIG. 2 illustrates a schematic diagram of an application environment in accordance with some embodiments of the present disclosure.

FIG. 2 illustrates a schematic diagram of an application environment in accordance with some embodiments of the present disclosure. An example environment for distributed application and update of a model is illustrated according to embodiments of the present disclosure. As shown, a trained machine learning model 210 is deployed at the computing device 120. The computing device 140, which has a higher computing capability, comprises a model training module 220 configured for update of the machine learning model 210.

Figure 3:
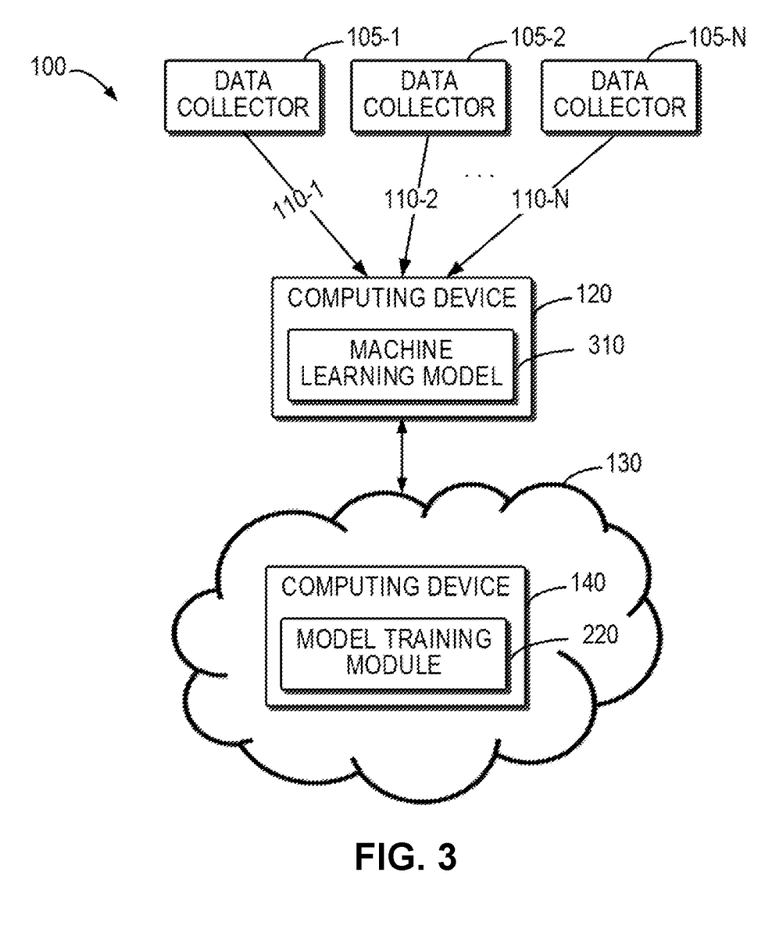
FIG. 3 illustrates a schematic diagram of an application environment according to some other embodiments of the present disclosure.

The computing device 140 may save the machine learning model 210 that has been currently deployed at the computing device 120 and then update the machine learning model 210 according to a model update rule. As shown in FIG. 3, the computing device 140 redeploys the updated machine learning model (referred to as a machine learning model 310) to the computing device 120. As such, the computing device 120 may use the new machine learning model 310 to process the data set 110 from the data collector 105.

Figure 4:
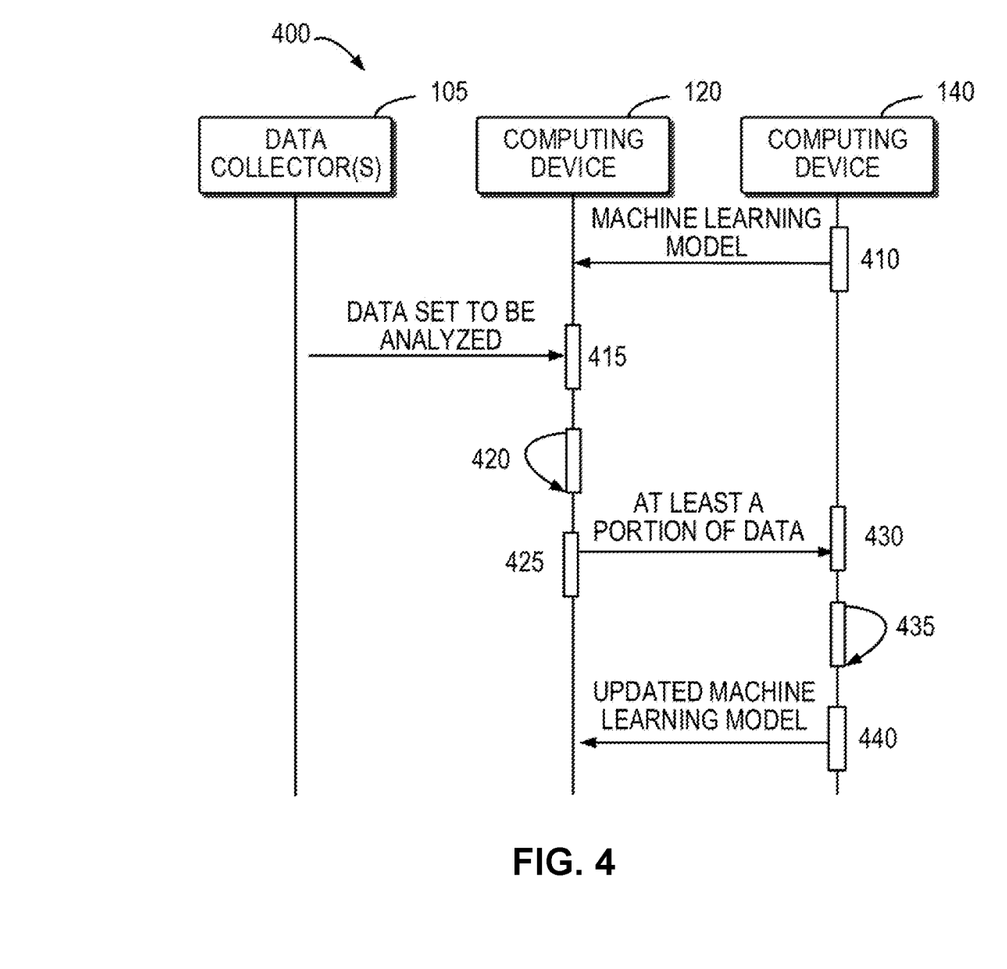
FIG. 4 illustrates a flowchart of a signaling flow for model adaptation in accordance with some embodiments of the present disclosure.

FIG. 4 illustrates a signaling flow 400 for model adaptation in accordance with some embodiments of the present disclosure. The signaling flow 400 involves the computing device 120, the computing device 140, and the data collector(s) 105. For purpose of discussion, the signaling flow 400 will be discussed with reference to FIG. 2 and FIG. 3.

The computing device 140 may be a device with a higher computing capability and thus may be used to implement model training. The computing device 140 deploys 410 a trained machine learning model 210 to the computing device 120. For example, the computing device 140 may send, to the computing device 120, configuration data of the machine learning model 210 and the values in the parameter set determined from the training.

The machine learning model 210 is configured and trained to be able to detect anomalies in the data. Data anomaly detection may be known as a classification task such as a two-class task (for example, determining whether the data is normal or abnormal) or a multi-class task (for example, determining which type of abnormal data or which type of normal data to which the data belongs). The machine learning model 210 may be configured as any type of model that is capable of implementing the data anomaly detection. Some examples of the machine learning model 210 include a Support Vector Machine (SVM) model, a Bayesian model, a random forest model, and various deep learning/neural network models such as Convolutional Neural Network (CNN), Recurrent Neural Network (RNN), and the like. In some embodiments, the configuration of the machine learning model 210 also depends on the type of the data to be analyzed (e.g., the data set 110 from the data collector(s) 105). In some examples, the machine learning model 210 may comprise a plurality of sub-models to process different types of data.

The machine learning model 210 may be trained based on training data. In the initial phase, the training data of the machine learning model 210 may be obtained from training data in databases. Model training may be generally divided into supervised and unsupervised learning. In the supervised learning, training input data and one or more labels of the training input data are used for training. Both the training input data and the label(s) are referred to as the training data of the machine learning model 210. The form of the training input data is input data supported by the machine learning model 210.

During the training, for each of one or more iterations, the machine learning model 210 processes the training input data based on the parameter values of the current parameter set, and provides the model output based on the current parameter set. The computing device 140, for example, the model training module 220 in the computing device 140, compares the model output with a label to determine whether the value of the parameter set of the machine learning model 210 is correct. For example, if the result of the comparison indicates that the difference is relatively large, the model training module 220 will continue to adjust the value of the parameter set. After certain convergence conditions are satisfied, the training of the machine learning model 210 is completed. In unsupervised learning, a label will not be needed, and the machine learning model 210 analyzes modes possibly occurring in the training input data to complete the training. It is to be appreciated that the above is only a brief introduction to model training. The model training module 220 of the computing device 140 may use various training algorithms to train the machine learning model 210.

In some embodiments, after the training of the machine learning model 210 is completed, it is possible to continue to use known testing data to test the trained machine learning model 210 to determine the performance of the machine learning model. The testing phase may also be completed by the computing device 140.

After obtaining the deployment of the machine learning model 210 from the computing device 140, the computing device 120 may use the machine learning model 210 to perform a corresponding data analysis task, especially the task of data anomaly detection. Specifically, the computing device 120 receives 415 a data set to be analyzed, such as a data set 110 to be analyzed, from one or more data collectors 105. The data collector(s) 105 may be configured to send the data to the computing device 120 periodically or intermittently, depending on a configuration of each data collector 105. The data collector(s) 105 may provide the data set 110 to the computing device 120 via a wired communication connection and/or a wireless communication connection.

The computing device 120 determines 420 abnormality of the data set 110 using the deployed machine learning model 210. The computing device 120 is an edge device whose speed of communication with the data collector 105 is usually higher than the communication speed between the data collector 105 and the computing device 140. Therefore, the data anomaly detection at the computing device 120 can improve the detection speed and provide a rapid response to the anomaly detection.

The data set 110 to be analyzed may, for example, be used as an input to the machine learning model 210 after pre-processing. If the machine learning model 210 comprises a plurality of sub-models, different data portions in the data set 110 may be provided to respective sub-models for processing. Generally, the machine learning model 210 can detect whether data in the data set 110 is abnormal. The criteria for data anomaly detection may be learned from the training data by the machine learning model 210 during the training phase, and the classification criteria for data anomaly may be configured by developers. For example, in an example of detecting an ambient temperature with a temperature sensor, whether there is a temperature anomaly event is determined based on whether currently collected temperature data is higher than a certain threshold or lower than a certain threshold. Data anomaly detection may help provide an alert for abnormal events. For example, an alert for a temperature anomaly event may be provided so that an engineer may confirm whether the temperature sensor has failed or whether there is a risk of data intrusion, for example, data tampering.

After determining the abnormality of the data set 110 using the machine learning model 210, the computing device 120 transmits 425 at least a portion of data in the data set 110 to the computing device 140 based on the determined abnormality of the data set 110, for use in updating of the machine learning model 210. The computing device 140 may, for example, be included in the cloud computing architecture 130 in the examples of FIG. 2 and FIG. 3. Therefore, the computing device 140 has a higher computing capability than the computing device 120, and the model updating process, which may consume more computing resources and more time, can be implemented by the computing device 140. In this way, not only the accuracy of the model update is ensured, but also the resources of the computing device 120 can be saved. Thus, the computing device 120 may focus on the data anomaly detection. Sometimes it may even be possible to achieve parallel implementation of the model update and the data anomaly detection, thereby further improving the efficiency.

The update of the machine learning model 210 may comprise retraining of the previous version of the machine learning model 210, so that the values in the parameter set of the machine learning model 210 may be fine-tuned to provide a more accurate output result, e.g., more accurate detection of abnormality of the data from the data collector(s) 105. Alternatively, the update of the machine learning model 210 further comprises updating the model configuration of the machine learning model 210, for example, changing the architecture of the model, including the number of hidden nodes in the model, the number of network layers, the number of nodes in an output layer, and the like, or configuring another type of machine learning model. For example, the machine learning model 210 may be configured to determine the data as abnormal or normal. The machine learning model with a new configuration may divide the data into a finer class, such as one of multiple abnormal types and one of multiple normal types.

In some embodiments, the data provided to the computing device 120 for updating the model may be that data determined by the machine learning model 210 to be normal data in the data set 110. As for the data determined to be abnormal in the data set 110, after an indication of anomaly of this portion of data is provided, the computing device 120 may discard this portion of data without using those data to further update the model.

Considering the classification, a data sample may be determined as positive or negative. For a two-class classification issue, there may be four cases. If a data sample is positive and is also predicted as positive by the machine learning model, this data sample may be referred to as a true positive data sample. If the positive data sample is incorrectly predicted as negative by the machine learning model, it may be referred to as a false negative data sample. If a data sample is negative but determined as positive by the machine learning model, the data sample is referred to as a false positive data sample. Otherwise, if the data sample is correctly predicted as negative by the machine learning model, it is referred to as a true negative data sample.

In the embodiments of data anomaly detection, it is assumed that abnormal data are classified as negative data samples and normal data are classified as a positive data samples. If the machine learning model 210 currently used by the computing device 120 can determine a portion of data in the data set 110 as abnormal data, the prediction of this portion of data by the machine learning model 210 may be considered correct because there are further subsequent processes for further detection and processing of the abnormal data during the data anomaly detection. Therefore, the data determined as abnormal in the data set 110 may be regarded as "true negative data" and may not be used to improve the detection accuracy of this portion of data by the model. Accordingly, the computing device 120 may not need to provide this portion of data to the computing device 140. If the currently-used machine learning model 210 predicts a portion of data in the data set 110 as normal data, this portion of data may be true positive data or false positive data, that is, the machine learning model 210 may or may not perform the prediction incorrectly. This portion of data is provided to the computing device 140 for the model update, which allows the model to be updated in such a way that abnormality of data similar to this portion of data can be detected more accurately.

The computing device 120 may continuously process the data to be analyzed from the data collector(s) 105 using the currently-deployed machine learning model 210 and provide the portion(s) of data determined to be normal to the computing device 140. After receiving 430 at least a portion of data in the data set 110 from the computing device 120, the computing device 140, for example, the model training module 220 in the computing device 140, updates 435 the machine learning model 210 based on the received data.

In some embodiments, the computing device 140 may store the portion of data received and start the model update process after the received data is accumulated to a certain amount. In some embodiments, in addition to obtaining the data for model update from the computing device 120, the computing device 140 may further obtain additional data for the model update from one or more other data sources. In one embodiment, if the model is updated in a supervised learning manner, the computing device 140 may further obtain one or more labels related to the data received from the computing device 120, with the one or more labels indicating whether the data is normal or abnormal. The computing device 140 may update the machine learning model 210 based on the data received from the computing device 120 and the label(s) associated with the data. The label(s) of the data may be obtained, for example, through manual labeling. As mentioned above, the update of the machine learning model 210 may, for example, include re-determining the values in the parameter set on the basis of the original configuration of the machine learning model 210, or determining values in a parameter set of a new machine learning model after changing or replacing the configuration of the machine learning model 210 with that of the new machine learning model. The update of the model is a process of model retraining, the details of which can refer to the above description of the model training.

After the training, the computing device 140 obtains the updated machine learning model, that is, the machine learning model 310. The computing device 140 redeploys 440 the machine learning model 310 to the computing device 120. Thus, the model used by the computing device 120 for data anomaly detection may evolve from the original machine learning model 210 to the new machine learning model 310. The computing device 120 may use the machine learning model 310 to perform the anomaly detection on the data set to be analyzed from the data collector(s) 105. The new machine learning model 310 after the evolution can provide a more accurate detection result.

Figure 5:
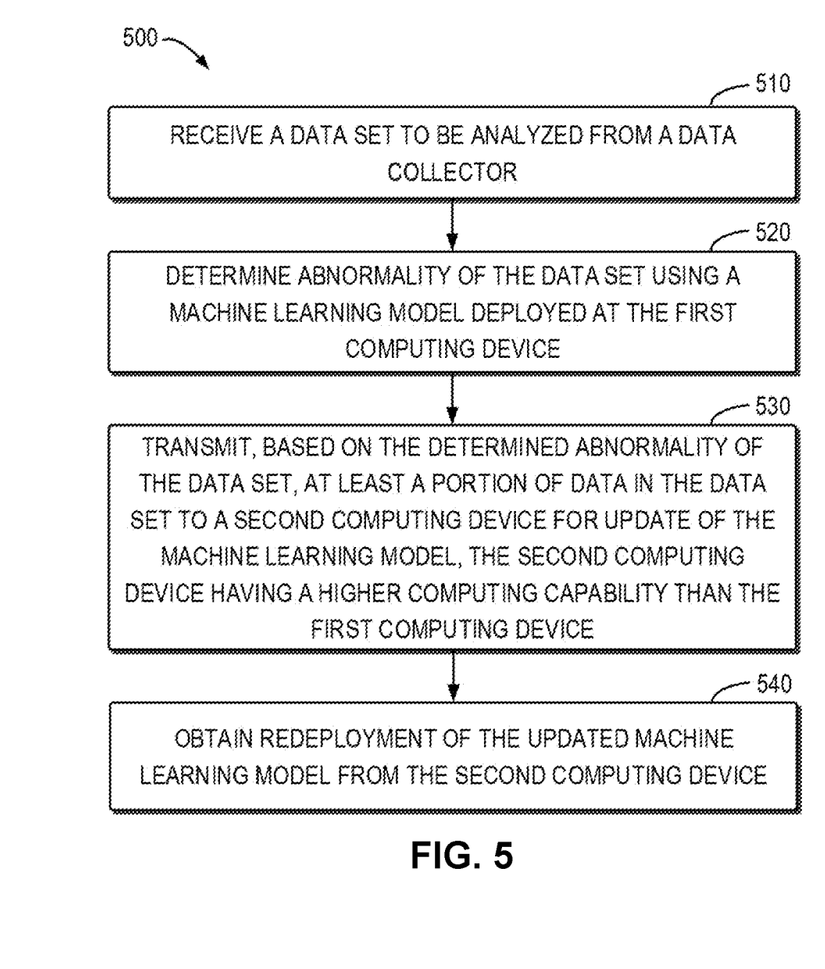
FIG. 5 illustrates a flowchart of a process for model adaptation in accordance with some embodiments of the present disclosure.

FIG. 5 shows a flowchart of a process 500 for model adaptation in accordance with some embodiments of the present disclosure. The process 500 may be performed by the computing device 120 of FIG. 1 and may be implemented in the example environment of FIG. 2 and FIG. 4.

At 510, the computing device 120 (sometimes also referred to as a first computing device) receives a data set to be analyzed from a data collector. At 520, the computing device 120 determines abnormality of the data set using a machine learning model deployed at the computing device 120. At 530, the computing device 120 transmits, based on the determined abnormality of the data set, at least a portion of data in the data set to a computing device 140 (sometimes also referred to as a second computing device) for update of the machine learning model. The computing device 140 has a higher computing capability than the computing device 120. At 540, the computing device 120 obtains redeployment of the updated machine learning model from the computing device 140.

In some embodiments, a communication speed between the computing device 120 and the data collector is higher than a communication speed between the computing device 140 and the data collector.

In some embodiments, transmitting at least a portion of data in the data set to the computing device 140 comprises: providing data determined to be normal in the data set to the computing device 140.

In some embodiments, the process 500 further comprises: discarding data determined to be abnormal in the data set after an indication of the abnormality of the data in the data set is provided.

In some embodiments, the computing device 120 comprises an edge computing node. In some embodiments, the computing device 140 is implemented in a cloud computing architecture. In some embodiments, the data collector comprises one or more IoT sensors or other IoT devices.

Figure 6:
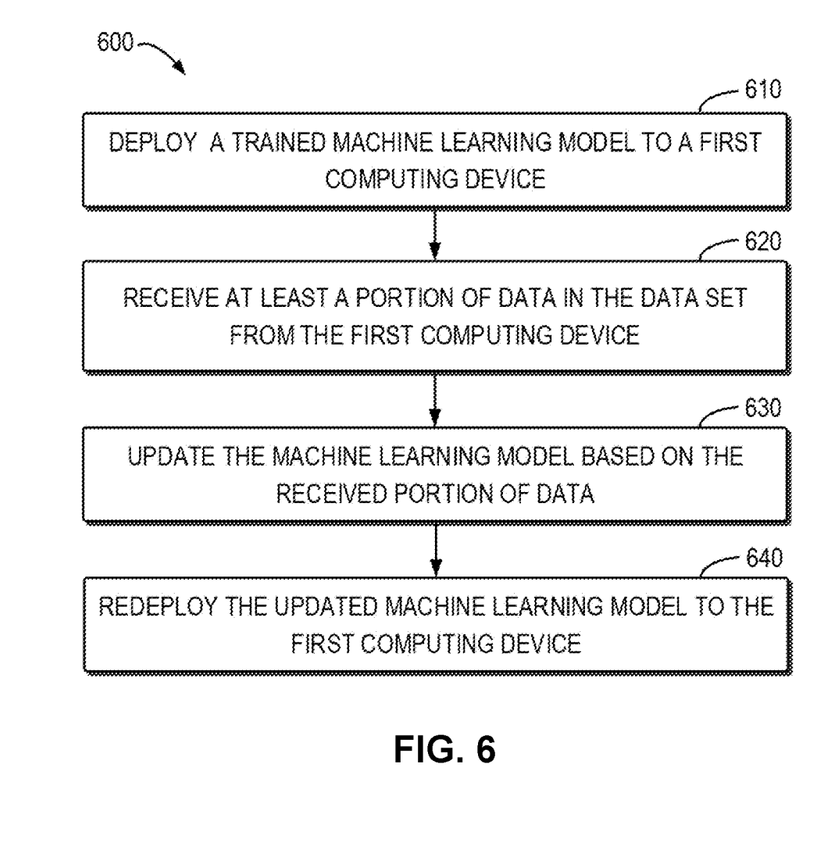
FIG. 6 illustrates a flowchart of a process for model adaptation in accordance with some embodiments of the present disclosure.

FIG. 6 shows a flowchart of a process 600 for model adaptation in accordance with some embodiments of the present disclosure. The process 600 may be performed by the computing device 140 of FIG. 1 and may be implemented in the example environment of FIG. 2 and FIG. 4.

At 610, the computing device 140 deploys a trained machine learning model to a computing device 120. The machine learning model is configured to determine abnormality of a data set to be analyzed from a data collector. The computing device 140 has a higher computing capability than the computing device 120. At 620, the computing device 140 receives at least a portion of data in the data set from the computing device 120. At 630, the computing device 140 updates the machine learning model based on the received portion of data. At 640, the computing device 140 redeploys the updated machine learning model to the computing device 120.

In some embodiments, receiving at least a portion of data in the data set to be analyzed comprises: receiving from the computing device 120, at least a portion of data determined to be normal by the machine learning model in the data set.

In some embodiments, updating the machine learning model comprises: obtaining a label related to the received data, the label indicating whether the portion of data is normal or abnormal; and updating the machine learning model based on the received portion of data and the label.

In some embodiments, a communication speed between the computing device 120 and the data collector is higher than a communication speed between the computing device 140 and the data collector.

In some embodiments, the computing device 120 comprises an edge computing node. In some embodiments, the computing device 140 is implemented in a cloud computing architecture. In some embodiments, the data collector comprises at least one IoT sensor or other IoT device.

Figure 7:
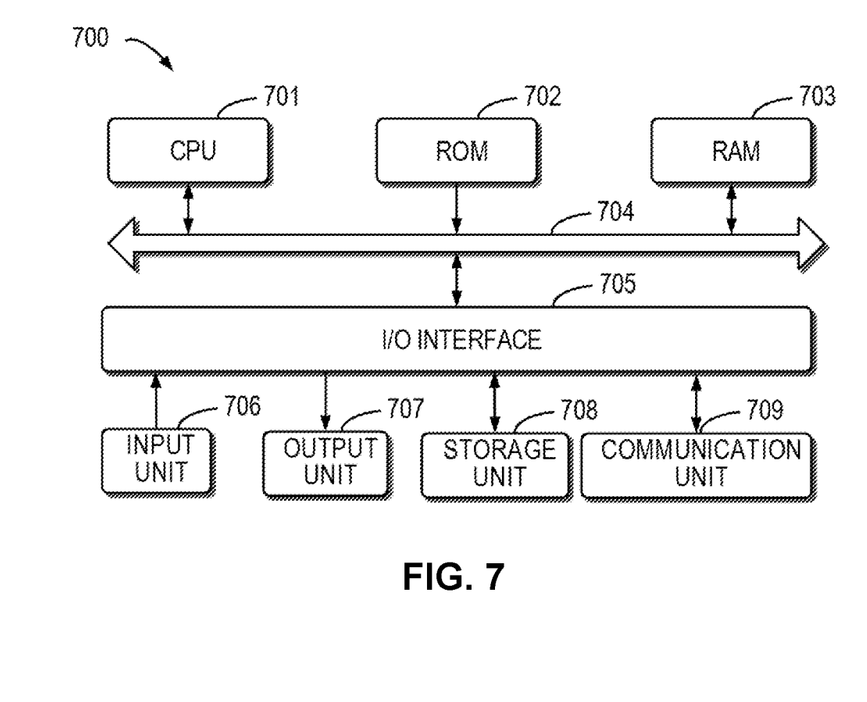
FIG. 7 illustrates a block diagram of an example device that can be used to implement the embodiments of the present disclosure.

FIG. 7 illustrates a block diagram of an example device 700 that can be used to implement the embodiments of the present disclosure. The device 700 can be used to implement the process 500 in FIG. 5 or the process 600 of FIG. 6. The device 700 may be implemented as the computing device 120 or the computing device 140 in FIG. 1.

As shown, the device 700 comprises a central processing unit (CPU) 701, which can perform various acts and processes according to computer program instructions stored in a read-only memory (ROM) 702 or loaded to a random-access memory (RAM) 703 from a storage unit 708. The RAM 703 can also store various programs and data required by the operations of the device 700. The CPU 701, ROM 702, and RAM 703 are connected to each other via a bus 704. An input/output (I/O) interface 705 is also connected to the bus 704.

The following components in the device 700 are connected to the I/O interface 705: an input unit 706 such as a keyboard, a mouse, or the like; an output unit 707 such as various types of displays and speakers; a storage unit 708 such as a magnetic disk or optical disk; and a communication unit 709 such as a network card, a modem, a wireless communication transceiver or the like. The communication unit 709 enables the device 700 to exchange information/data with other devices via a computer network such as the Internet and/or various telecommunication networks.

Various methods and processes described above, such as the process 500 or the process 600, can also be performed by the processing unit 701. In some embodiments, the process 500 or the process 600 can be implemented as a computer software program or a computer program product tangibly comprised in a machine-readable medium, such as a non-transitory computer-readable medium, for example the storage unit 708. In some embodiments, the computer program can be partially or fully loaded and/or mounted to the device 700 via the ROM 702 and/or the communication unit 709. When the computer program is loaded to the RAM 703 and executed by the CPU 701, one or more steps of the process 500 or the process 600 described above can be implemented. Alternatively, the CPU 701 can be configured via any other suitable manner (e.g., by means of firmware) to perform the process 500 or the process 600 in other embodiments.

It is to be understood by those skilled in the art that the above steps of the methods of the present disclosure may be implemented by a general-purpose computing device(s), being integrated on a single computing device or distributed on a network comprising multiple computing devices. Alternatively, the above steps of the methods may be implemented with program code executable by a computing device, so that they may be stored in a storage device and executed by the computing device, or may be fabricated as individual integrated circuit modules, respectively, or multiple modules or steps may be fabricated as individual integrated circuit modules for implementation. As such, the present disclosure is not limited to any particular combination of hardware and software.

It is to be appreciated that although several means or sub-means of the device are mentioned in the detailed description above, this division is merely exemplary, not mandatory. In fact, in accordance with embodiments of the present disclosure, the features and functions of the two or more devices described above may be embodied in one device. On the other hand, the features and functions of one device described above may be further divided and embodied by a plurality of devices.

Illustrative embodiments of the present disclosure are described above, and are not intended to limit the present disclosure. For those skilled in the art, the present disclosure may have various modifications and changes. Any modification, equivalent replacements, and improvement made within the spirit and principle of this disclosure should be comprised in the scope of the present disclosure.

What is claimed is:

1. A method for model adaptation, comprising:
receiving, at a first computing device, a data set to be analyzed from a data collector;
determining abnormality of the data set using a machine learning model deployed at the first computing device;
transmitting, based on the determined abnormality of the data set, at least a portion of data in the data set to a second computing device for update of the machine learning model, the second computing device having a higher computing capability than the first computing device; and
obtaining redeployment of the updated machine learning model from the second computing device;
wherein the first computing device comprises an edge computing node; and
wherein the second computing device comprises a cloud computing device.

2. The method of claim 1, wherein a communication speed between the first computing device and the data collector is higher than a communication speed between the second computing device and the data collector.

3. The method of claim 1, wherein transmitting at least a portion of data in the data set to the second computing device comprises:
providing data determined to be normal in the data set to the second computing device.

4. The method of claim 1, further comprising:
after an indication of the abnormality of the data in the data set is provided, discarding data determined to be abnormal in the data set.

5. The method of claim 1, wherein the data collector comprises at least one Internet of Things (IoT) device.

6. A method for model adaptation, comprising:
deploying a trained machine learning model to a first computing device, by a second computing device, the machine learning model being configured to determine abnormality of a data set to be analyzed from a data collector, and the second computing device having a higher computing capability than the first computing device;
receiving at least a portion of data in the data set from the first computing device;
updating the machine learning model based on the received portion of data; and
redeploying the updated machine learning model to the first computing device;
wherein the first computing device comprises an edge computing node; and
wherein the second computing device comprises a cloud computing device.

7. The method of claim 6, wherein receiving at least a portion of data in the data set comprises:
receiving, from the first computing device, at least a portion of data determined to be normal by the machine learning model in the data set.

8. The method of claim 7, wherein updating the machine learning model comprises:

obtaining a label related to the received portion of data, the label indicating whether the portion of data is normal or abnormal; and updating the machine learning model based on the received portion of data and the label.

9. The method of claim 6, wherein a communication speed between the first computing device and the data collector is higher than a communication speed between the second computing device and the data collector.

10. The method of claim 6, wherein the data collector comprises at least one Internet of Things (IoT) device.

11. An apparatus comprising at least one of a first electronic device and a second electronic device, the first electronic device comprising:

at least one processor; and
at least one memory storing computer program instructions, the at least one memory and the computer program instructions being configured, with the at least one processor, to cause the first electronic device to perform acts comprising:

receiving a data set to be analyzed from a data collector;
determining abnormality of the data set using a machine learning model deployed at the first electronic device;
transmitting, based on the determined abnormality of the data set, at least a portion of data in the data set to a second electronic device for update of the machine learning model, the second electronic device having a higher computing capability than the first electronic device; and
obtaining redeployment of the updated machine learning model from the second electronic device;
wherein the first electronic device comprises an edge computing node; and
wherein the second electronic device comprises a cloud computing device.

12. The apparatus of claim 11, wherein a communication speed between the first electronic device and the data collector is higher than a communication speed between the second electronic device and the data collector.

13. The apparatus of claim 11, wherein transmitting at least a portion of data in the data set to the second electronic device comprises:

providing data determined to be normal in the data set to the second electronic device.

14. The apparatus of claim 11, wherein the acts further comprise:

after an indication of the abnormality of the data in the data set is provided, discarding data determined to be abnormal in the data set.

15. The apparatus of claim 11, wherein the data collector comprises at least one Internet of Things (IoT) device.

16. The apparatus of claim 11, wherein the second electronic device comprises:

at least one processor; and
at least one memory storing computer program instructions, the at least one memory and the computer program instructions being configured, with the at least one processor, to cause the second electronic device to perform acts comprising:

deploying the machine learning model to the first electronic device;
receiving at least a portion of data in the data set from the first electronic device;
updating the machine learning model based on the received portion of data; and
redeploying the updated machine learning model to the first electronic device.

17. The apparatus of claim 16, wherein receiving at least a portion of data in the data set comprises:

receiving, from the first electronic device, at least a portion of data determined to be normal by the machine learning model in the data set.

18. The apparatus of claim 17, wherein updating the machine learning model comprises:

obtaining a label related to the received portion of data, the label indicating whether the portion of data is normal or abnormal; and
updating the machine learning model based on the received portion of data and the label.

19. A computer program product being tangibly stored on a non-transitory computer-readable medium and comprising computer-executable instructions which, when executed, cause a device to perform the method of claim 1.

20. A computer program product being tangibly stored on a non-transitory computer-readable medium and comprising computer-executable instructions which, when executed, cause a device to perform the method of claim 6.

* * * * *